United States Patent
Krishnan et al.

(10) Patent No.: US 10,977,025 B2
(45) Date of Patent: Apr. 13, 2021

(54) INTELLIGENT SOFTWARE ASSET CLASSIFICATION FOR SOFTWARE UPDATE VALIDATION

(71) Applicant: MICROSOFT TECHNOLOGY LICENSING, LLC, Redmond, WA (US)

(72) Inventors: Vijay Krishnan, Sammamish, WA (US); Muskan Kukreja, Redmond, WA (US); Sandi Ganguly, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 29 days.

(21) Appl. No.: 16/183,708

(22) Filed: Nov. 7, 2018

(65) Prior Publication Data
US 2020/0142685 A1  May 7, 2020

(51) Int. Cl.
*G06F 8/65* (2018.01)
*G06F 8/77* (2018.01)
(Continued)

(52) U.S. Cl.
CPC ............. *G06F 8/65* (2013.01); *G06F 8/77* (2013.01); *G06N 20/00* (2019.01); *G06F 11/3668* (2013.01)

(58) Field of Classification Search
CPC .......... G06F 8/65; G06F 8/77; G06F 11/3668; G06N 20/00
See application file for complete search history.

(56) References Cited

U.S. PATENT DOCUMENTS

| 7,146,608 B1 * | 12/2006 | Newman .................. G06F 8/71 717/168 |
| 7,191,435 B2 * | 3/2007 | Lau ........................... G06F 8/65 714/38.1 |

(Continued)

FOREIGN PATENT DOCUMENTS

| EP | 2866408 A1 * | 4/2015 | .......... G06F 11/3664 |
| EP | 2866408 A1 | 4/2015 | |

(Continued)

OTHER PUBLICATIONS

"Application as Filed in US Patent Application No. PCT/CN18/091500", Filed Date: Jun. 15, 2018, 43 Pages.

(Continued)

*Primary Examiner* — Douglas M Slachta
(74) *Attorney, Agent, or Firm* — NovoTechIP International PLLC

(57) ABSTRACT

A system is disclosed, which includes a processor and a memory in communication with the processor. The memory includes executable instructions that, when executed by the processor, cause the processor to control the system to perform functions of collecting software asset information of software assets installed in hardware assets of an organization; determining popularity metrics of the software assets based on the collected software asset information; classifying, based on the popularity metrics, the software assets into a plurality of popularity groups; identifying, based on the classification, a pilot test software asset sample group; identifying, based on the pilot test software asset sample group, a pilot test hardware asset sample group; and deploying the new software asset to the pilot test hardware asset sample group for executing the pilot test of the new software asset.

20 Claims, 8 Drawing Sheets

(51) Int. Cl.
  *G06N 20/00* (2019.01)
  *G06F 11/36* (2006.01)

(56) References Cited

U.S. PATENT DOCUMENTS

| | | | | |
|---|---|---|---|---|
| 7,500,234 | B2* | 3/2009 | Hatasaki | G06F 8/64 |
| | | | | 717/168 |
| 8,839,222 | B1 | 9/2014 | Brandwine et al. | |
| 8,856,774 | B1* | 10/2014 | Kulaga | G06F 11/368 |
| | | | | 717/168 |
| 8,977,764 | B1* | 3/2015 | Ramzan | G06F 11/3466 |
| | | | | 709/231 |
| 9,009,694 | B2* | 4/2015 | DiRico | G06F 9/453 |
| | | | | 717/168 |
| 9,009,738 | B2 | 4/2015 | Matichuk | |
| 9,246,935 | B2 | 1/2016 | Lietz et al. | |
| 9,934,384 | B2 | 4/2018 | Johansson et al. | |
| 10,067,857 | B2* | 9/2018 | Ekambaram | G06F 11/3688 |
| 10,073,692 | B2 | 9/2018 | Carter | |
| 10,089,661 | B1* | 10/2018 | Appalaraju | G06F 16/907 |
| 10,664,256 | B2* | 5/2020 | Farrell | G06F 8/60 |
| 10,831,466 | B2* | 11/2020 | O'Malley | H04L 67/303 |
| 2004/0060044 | A1* | 3/2004 | Das | G06F 8/65 |
| | | | | 717/171 |
| 2011/0078675 | A1* | 3/2011 | Van Camp | G06F 8/65 |
| | | | | 717/170 |
| 2012/0240236 | A1* | 9/2012 | Wyatt | G06F 21/10 |
| | | | | 726/25 |
| 2014/0109052 | A1* | 4/2014 | Tempel | G06F 9/45558 |
| | | | | 717/124 |
| 2015/0143345 | A1* | 5/2015 | Patton | H04L 67/10 |
| | | | | 717/131 |
| 2016/0092339 | A1* | 3/2016 | Straub | G06F 9/44521 |
| | | | | 717/124 |
| 2016/0259638 | A1* | 9/2016 | El Maghraoui | G06F 40/30 |
| 2018/0004648 | A1* | 1/2018 | Kidron | G06F 11/3664 |
| 2018/0095859 | A1* | 4/2018 | Jayaraman | G06F 11/3688 |
| 2019/0295105 | A1* | 9/2019 | Sharma | G06Q 30/0203 |

FOREIGN PATENT DOCUMENTS

| | | |
|---|---|---|
| WO | 2012154848 A1 | 11/2012 |
| WO | 2017071425 A1 | 5/2017 |

OTHER PUBLICATIONS

"Application as Filed in U.S. Appl. No. 16/035,634", filed Jul. 14, 2018, 41 Pages.

"International Search Report and Written Opinion Issued in PCT Patent Application No. PCT/US2019/058689", dated Jan. 31, 2020, 11 Pages.

* cited by examiner

| Operating System (OS) | Antivirus (AV) | Productivity Suite (PS) | Web Browser (BR) | Mortgage Calculator (MC) | ⋮ |
|---|---|---|---|---|---|
| OSU1 | AVU1 | PSU1 | BRU1 | MCA1 | |
| OSU2 | AVA1 | PSA1 | BRU2 | MCA2 | |
| OSA1 | | PSA2 | BRA1 | MCU1 | |
| | | PSA3 | BRA2 | | |

| Operating System (OS) | Antivirus (AV) | Productivity Suite (PS) | Web Browser (BR) | HR Management (HR) | ⋮ |
|---|---|---|---|---|---|
| OSU1 | AVU1 | PSU1 | BRU1 | HRA1 | |
| OSU2 | AVA1 | PSA1 | BRU2 | HRU1 | |
| OSA1 | | PSA2 | BRA1 | | |
| OSA2 | | PSA4 | BRA3 | | |
| | | PSA5 | | | |

INTELLIGENT SOFTWARE ASSET CLASSIFICATION FOR SOFTWARE UPDATE VALIDATION

BACKGROUND

For any organizations with sizable IT assets, deploying new software or updating existing software is an overwhelming task because very often the IT assets have different hardware/software configurations and it is simply impossible to predict how differently configured assets react to the deployment. Some organizations have relied on a time-consuming full test pass prior to deploying of a full-scale software installation or update rollout. The full test pass model, however, cannot scale to faster cadence releases. Hence, various attempts have been made to minimize a pilot test sample size, including manually selecting test sample assets, randomly selecting pilot test samples based on a population size, etc. However, these approaches cannot cover all the software asset installation and configuration variations. Hence, some of critical software assets may not be tested at all prior to a full-scale rollout, which may cause the software and hardware assets to malfunction or even crash once the full-scale rollout is completed. Accordingly, there still remain significant areas for new and improved approaches to more accurately identify software assets for validation prior to a full-scale roll out.

SUMMARY

A method of operating a system is disclosed, which includes a processor and a memory in communication with the processor. The memory includes executable instructions that, when executed by the processor, cause the processor to control the system to perform functions of receiving, over a communication network, software asset information of a plurality of software assets installed in a plurality of hardware assets of an organization; determining popularity metrics of the software assets based on the collected software asset information; classifying, based on the popularity metrics, the software assets into a plurality of popularity groups; identifying, based on the classification, a group of the software assets to be validated for a software update; identifying, based on the identified group of the software assets, a group of the hardware assets to be tested for the software update; and deploying, over the communication network, the software update to the identified group of the hardware assets to validate the identified group of the software assets.

In another implementation, a method includes receiving, over a communication network, software asset information of a plurality of software assets installed in a plurality of hardware assets of an organization; determining popularity metrics of the software assets based on the collected software asset information; classifying, based on the popularity metrics, the software assets into a plurality of popularity groups; identifying, based on the classification, a group of the software assets to be validated for a software update; identifying, based on the identified group of the software assets, a group of the hardware assets to be tested for the software update; and deploying, over the communication network, the software update to the identified group of the hardware assets to validate the identified group of the software assets.

In another implementation, a system includes means for receiving, over a communication network, software asset information of a plurality of software assets installed in a plurality of hardware assets of an organization; means for determining popularity metrics of the software assets based on the collected software asset information; means for classifying, based on the popularity metrics, the software assets into a plurality of popularity groups; means for identifying, based on the classification, a group of the software assets to be validated for a software update; means for identifying, based on the identified group of the software assets, a group of the hardware assets to be tested for the software update; and means for deploying, over the communication network, the software update to the identified group of the hardware assets to validate the identified group of the software assets.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 4A and 4B illustrate example software assets installed in two different hardware assets.

DETAILED DESCRIPTION

Figure 1:
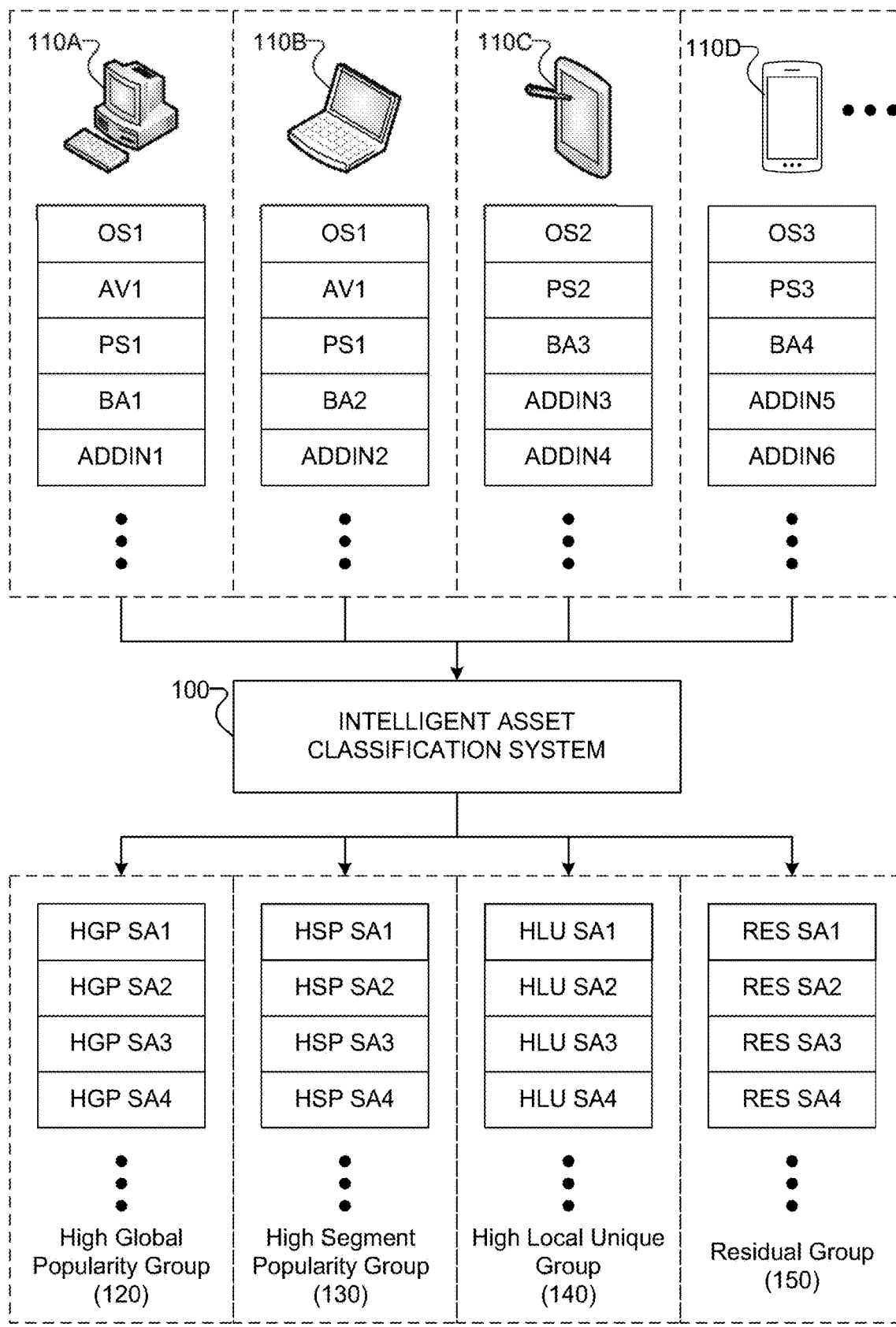
FIG. 1 conceptually illustrates a plurality of software assets being classified into a plurality of popularity groups by an intelligent asset classification system.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This disclosure is directed to a system for accurately and reliably identifying software assets that need to be validated for a software update prior to deploying a full-scale software update rollout. Depending on an organization size, software assets in an organization can be as many as hundreds or even thousands, which may be installed in numerous hardware assets in various configurations and combinations. The hardware assets may be any device, apparatus, tool or system that performs a functions, tasks, or activities based on software instructions, such as, computer, mobile device, printer, telephone, conferencing device, data storage, printer, etc. When an update is required, some of the hardware assets may be manually selected or randomly sampled based on the hardware asset population size for validation prior to a full-scale update rollout. These approaches, however, may not cover all the software assets installed in the hardware assets, and some of the critical software assets important to the organization's success may not be included in a pool of the hardware assets selected for validation. Hence, in some cases, the pilot testing may be performed without testing software assets that are not compatible with the update and hence cannot be validated for the update. This failure to identify and validate critical software assets may cause the software assets and hardware assets to malfunction or even crash once a full-scale rollout is completed, which could interrupt business operations of the organization for an extended period of time.

To solve these problems, popularity metrics of the software assets may be automatically determined at various scale levels, such as, global, segment and local levels. Based on the popularity metrics at various scale levels, the software assets may be automatically classified into a plurality of popularity groups, for example, a high global popularity (HGP) group, high segment popularity (HSP) group, high local unique (HLU) group and residual group. Other factors may also be considered, for example, local usage information of each software asset, importance information of the hardware assets running the software assets, etc.

Based on the classification, the software assets that have a high popularity metric in at least one scale level may be automatically identified as potential targets for validation. For example, the software assets having a high popularity metric at the global or segment level may be automatically identified as target software assets for validation. The classification may also allow to automatically identify software assets that are only locally popular or important, which would normally be overlooked for being unpopular at the global and segment levels. Then, based on the identified software assets, a set of hardware assets may be automatically selected, and a pilot test may be automatically carried out on the selected set of the hardware assets. Hence, software assets that needed to be validated may be automatically identified in an accurate and reliable manner. Also, all the critical software assets may be validated prior to deploying a full-scale update rollout. Accordingly, a time-consuming and error-prone pilot testing and subsequent full-scale update rollout may be executed in a reliable and streamlined manner.

In the specific examples below, a software asset may refer to any type of computer programs, such as, an operating system (OS), software application, software add-in, driver, etc., which may be owned or operated by an organization. A software application (or application) may refer to any computer program designed to perform a group of coordinated functions, tasks, or activities, such as, antivirus application, productivity suite, media creation application, mortgage calculation application, human resource (HR) management application, etc. A software add-in (or add-in) may refer to a software component (e.g., a macro, patch, pack, package, plug-ins, etc.) that adds a specific feature to an existing computer program. A software update (or update) may refer to any software change to the exiting IT assets, including, for example, a new software installation, update to an existing software piece, upgrade to a new version, modification, uninstallation or removal of an existing software piece, etc.

FIG. 1 conceptually illustrates a plurality of software assets being classified into a plurality of popularity groups by an intelligent asset classification system 100. The system 100 may be implemented locally or remotely from an IT inventory of an organization. The IT inventory may include a plurality of hardware assets, in which the software assets are installed in various combinations and configurations.

The hardware assets may include various types of devices, such as, a first hardware asset 110A (e.g., a desktop), second hardware asset 110B (e.g., a laptop), third hardware asset 110C (e.g., a tablet) and fourth hardware asset 110D (e.g., smartphone), which are collectively referred to as "hardware assets 110" hereinafter. Most hardware assets 110 may operate one or more software assets in different combinations. For example, as shown in FIG. 1, the first and second hardware assets 110A and 110B may operate the same operating system OS1, antivirus application AV1 and productivity suite PS1. However, the first and second hardware assets 110A and 110B may operate different business applications BA1 (e.g., mortgage calculation application) and BA2 (e.g., human resource (HR) management application), respectively. Also, the first and second hardware assets 110A and 110B may be installed with different add-ins ADDIN1 (e.g., a plug-in for the business application B1) and ADDIN2 (e.g., a patch for the business application B2), respectively. The mobile hardware assets 110C and 110D may operate mobile operating systems OS2 and OS3, respectively. The mobile hardware assets 110C and 110D may also operate business applications BA3 and BA4, respectively, which may be mobile versions of the business applications BA1 and BA2, respectively. The mobile hardware assets 110C and 110D may also be installed with add-ins, for example, third to sixth add-ins ADDIN3, ADDIN4, ADDIN5 and ADDIN6, which may be specific to the mobile operations system OS2 or OS3.

Figure 2:
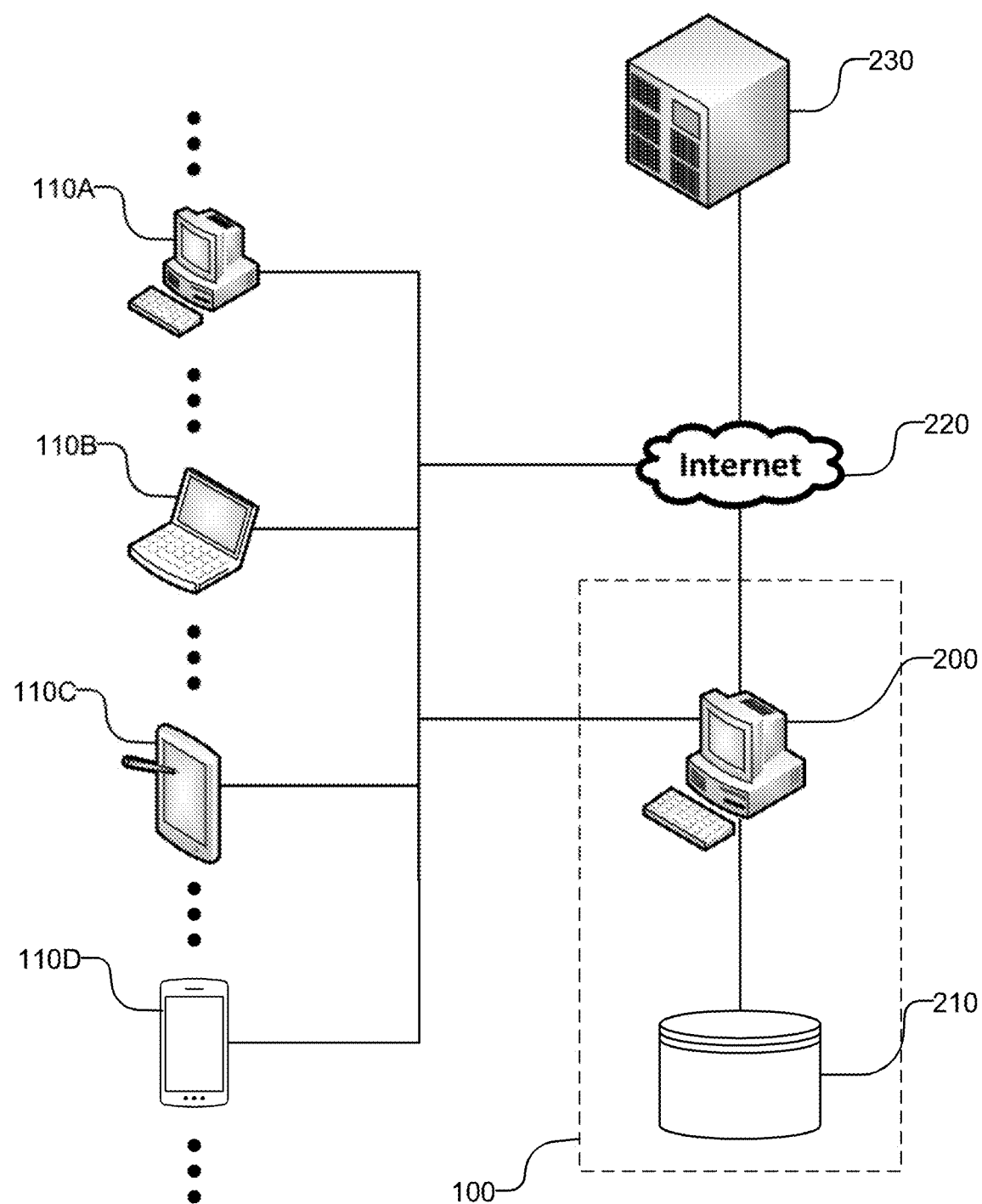
FIG. 2 illustrates an example intelligent software asset system of FIG. 1.

FIG. 2 illustrates an example intelligent software asset classification system 100 of FIG. 1. The system 100 may include a computing device 200 and data storage 210. The computing device 200 may be any type of a computing device, such as, a server, desktop, laptop, tablet, etc. The device 200 may be equipped with networking capabilities to be communicable with the hardware assets 110 and data storage 210 via one or more commination channels. The device 200 and data storage 210 may be located within the organization and connected to the hardware assets 110 via the organization's network facilities. Alternatively, the device 200 and data storage 210 may be located remotely from the organization and connected to the hardware asset 110 via the Internet 220. The data storage 210 may store various data related to the operations of the system 100, such as, IT asset inventory data of the organization, software/hardware asset user profile data, previous validation data, previous validation failure data, etc.

The device 200 may also be connected, via the Internet 220, one or more external sources, such as, an external data server 230, to receive various information related to the operations of the system 100, such as, global and segment software asset installation and usage statistic data, software asset validation data, software asset validation failure data, industry/segment classification and statistics data, etc. The information received from the external sources may be stored in the data storage 210. The device 200 may also send the internal validation-related data to the external sources, such as the external data server 230, to share the previous validation data, validation failure data, etc. with other organizations. By sharing or publishing the previous validation-related information, other organizations may avoid performing the same validation test, which may save the time and effort to perform a validation test. Also, when a validation failure occurs, the software developer may be notified with the details of the validation failure, which may allow the developer to provide solutions in a timely manner. Hence, the system 100 may operate in collaboration with other organizations or a centralized hub organization, such as Microsoft™, to share the validation data.

In an implementation, the device 200 may scan the hardware assets 110 to collect various software asset information, such as installation and usage information of the software assets. The installation information may include a number of installations of each software asset. The usage information may include a frequency or duration of each software asset being used. The device 200 may also collect additional information, such as, global popularity information and segment popularity information of each software asset, which may be internally stored in the data storage 210 or obtained from the external sources, such as, the external data server 230 via the Internet 220. The hardware assets assigned to executives or management team members may operate one or more critical software assets that may not be popular at the overall local level. Hence, importance data (e.g., an importance ranking, score, level, grade, etc.) of the hardware assets may also be collected such that the software assets installed in the important hardware assets may become more noticeable.

Based on the collected software asset information, global and local popularity information, hardware asset importance data, etc., the device 200 may determine popularity metrics of the software assets at various scale levels, such as, global, segment and local levels.

Figure 3:
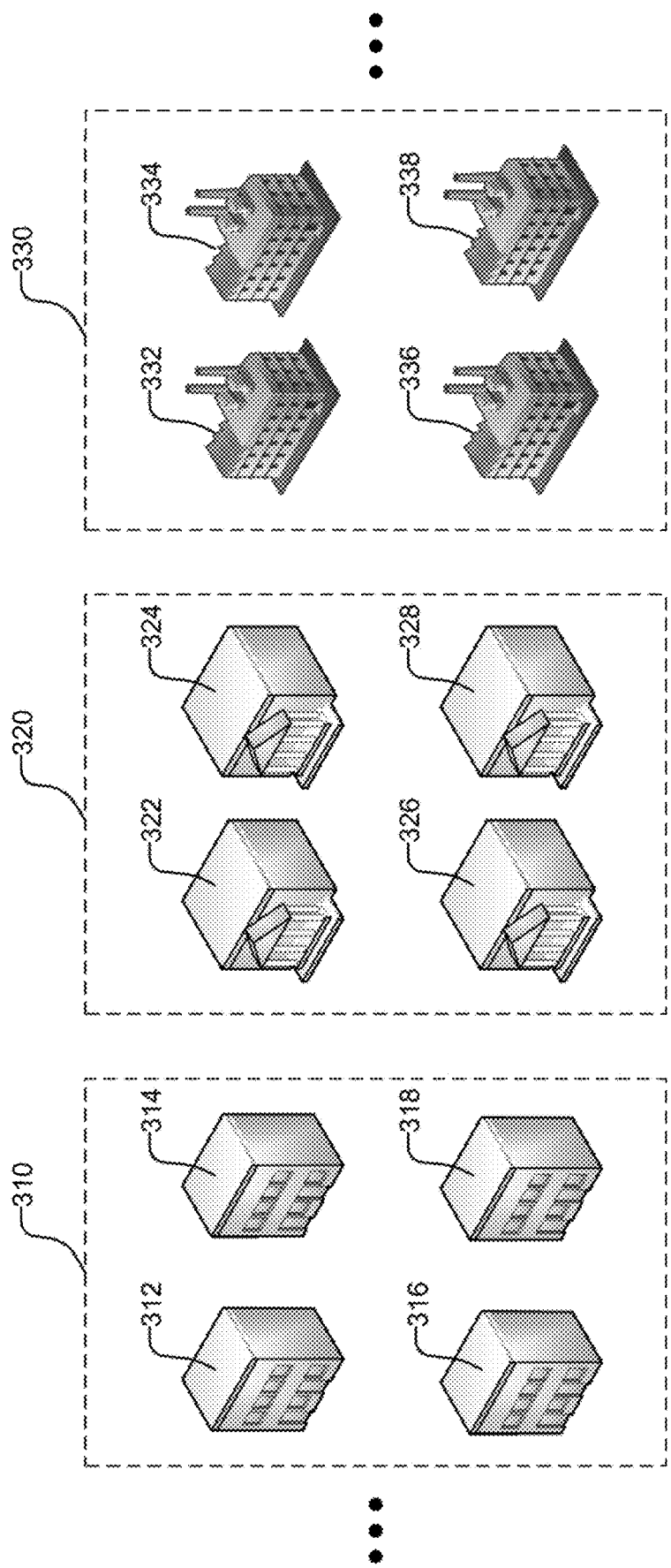
FIG. 3 illustrates example industry segmentation of various types of organizations.

FIG. 3 illustrates example industry segmentation of various types of organizations. The organizations may include a magazine company 312, recording company 314, textbook company 316 and map company 318, which may be segmented as belonging to the publishing industry 310. The recording company 314 may also be segmented as belonging to the music industry segment, which may also include a musical instrument company, concert management company, etc. Hence, the recording company may select which industry or business segment it belongs to more accurately determine the popularity of the software assets at the segment level. The organizations may also include a bank 322, mortgage company 324, investment company 326 and insurance company 328, which may be segmented as the financial service industry 320. The mortgage company 324 may also be segmented as belonging to the mortgage business for more accurate segment level popularities of the software assets. The organizations may further include an auto manufacturer 332, semiconductor company 334, tire company 336 and toy company 338, which may be segmented as the manufacturing industry 330.

A popularity metric at the local level may indicate how popular a software asset is within the same organization, such as, the magazine company 312, mortgage company 324 or toy company 338. For example, the device 200 may determine a local popularity index of each software asset of the mortgage company 324 based on a ratio between (i) a number of the hardware assets installed with the software asset within the mortgage company 324 and (ii) a number of the total hardware assets within the mortgage company 324. The device 200 may also determine a local usage index of each software asset based on a ratio between (i) the usage frequency or duration of each software asset within the mortgage company 324 and (ii) the total usage frequency or duration of all the software assets within the mortgage company 324. The device 200 may then determine a local popularity of each software asset based on the local popularity index and local usage index. The hardware asset importance data may be also be considered in determining the local popularity index of the software assets installed in the important hardware assets. Also, the device 200 may use the hardware asset importance data to flag the software assets installed in the important hardware assets to ensure that those software assets are included in a pool of the software assets for validation regardless of their popularity index.

A popularity metric at the segment level may indicate how popular a software asset is within the same or similar industry or business segment (e.g., publishing industry 310, financial service industry 320 or manufacturing industry 330) to which the organization belongs. For example, the device 200 may determine a segment popularity index of each software asset in an organization (e.g., a mortgage company) based on a ratio between (i) a total number of organizations (e.g., mortgage companies) belonging to the same industry segment (e.g., the "banking" industry) or the same business segment (e.g., the "mortgage" business) and operating the same software asset and (ii) a total number of the organizations in the same industry or business segment, which may be available from the segment popularity information. The segment popularity information may be received from the external sources, such as the external data server 230 shown in FIG. 2.

A popularity metric at the global level may indicate how popular a software asset is across all the different industry and business segments including the publishing industry 310, financial service industry 320, manufacturing industry 330, etc. and all the different organizations including the map company 318, investment company 326, toy company 338, etc. For example, the device 200 may determine a global popularity index of each software asset based on a ratio between (i) a total number of the organizations operating the software asset and (ii) a total number of organizations across all the industry and business segments, which may be available from the global popularity information. Similar to the segment popularity information, the global popularity information may be received from the external sources, such as the external data server 230 shown in FIG. 2.

Some of the software assets may have a high popularity at more than one scale levels. For example, an operating system, such as, Microsoft™ Windows 10™ may be high popular not only at the local level but also at the segment and global levels. On the other hand, a professional photo-editing program, such as, Adobe™ Photoshop™ may be highly popular at the local and segment levels in the publication industry 310 but may not be popular at all in other industry or business segments, such as, the banking industry 320 and manufacturing industry 330. Some software assets may be popular only at the local level. For example, a proprietary mortgage calculation application developed specifically for the mortgage company 324 may be one of the most heavily used application at the local level, but may not be used at all in other companies in the same business (e.g., other mortgage companies) and the same financial service industry 320 (e.g., the bank 322, investment company 326, insurance company 328, etc.), and different industry or business segments (e.g., the publishing industry 310, manufacturing industry 330, etc.). Some software assets may have no discernable popularity at any of the scale levels.

Based on the popularity of each asset at various scale levels, the device 200 may classify the software assets into a plurality of popularity groups, such as, a high global popularity (HGP) group 120, high segment popularity (HSP) group 130, high local unique (HLU) group 130 and residual group 150, as shown in FIG. 1.

In an implementation, the local popularity index, local usage index, segment popularity index and global popularity index may be set such that an index value greater than 70 (out of 100) is high, an index value smaller than 30 is low, and an index value between 30 and 70 is medium. The software assets having high local popularity and usage indexes and a high global popularity index may be classified to the HGP group 120 regardless of the segment popularity index. The software assets having high local popularity and usage indexes, a high segment popularity index and a low global popularity index may be classified as the HSP group 130. The software assets having low global and segment popularity indexes and a high local popularity and usage indexes may be classified to the HLU group 140. The software assets having low local, segment and global popularity indexes and a low local usage index may also be classified to the HLU group 140 if the local popularity and usage indexes are high among the hardware assets having high importance scores or rankings. Other software assets that are not classified to any of the groups 120, 130 and 140 may be classified to the residual group 150.

FIGS. 4A and 4B illustrate example software assets installed in two different hardware assets, for example, the first and second hardware assets 110A and 110B, respectively. The first hardware asset 110A may include an operating system OS, first OS update OSU1, second OS update OSU2, first OS add-in OSA1, antivirus application AV, first AV update AVU1, first AV add-in AVA1, productivity suite PS, first PS add-in PS1, second PS add-in PSA2, third PS add-in PSA3, web-browser BR, first BR update BRU1, second BR update BRU2, first BR add-in BRA1, second BR add-in BRA2, mortgage calculation application MC, first MC add-in MCA1, second MC add-in MCA2, first MC update MCU1, etc.

Some of these software assets may not be installed in the second hardware asset 110B, such as, third PS add-in PSA3, second BR add-in BRA2, mortgage calculation application MC, first MC add-in MCA1, second MC add-in MCA2, first MC update MCU1, etc. Some of the software assets installed in the first hardware asset 110A may also be installed in the second hardware asset 110B, such as, the operating system OS, first OS update OSU1, second OS update OSU2, first OS add-in OSA1, antivirus application AV, first AV update AVU1, first AV add-in AVA1, productive suite PS, first PS update PSU1, first PS add-in PSA1, second PS add-in PSA2, web browser BR, first BR update BRU1, second BR BRU2, first BR add-in BRA1, etc.

The second hardware asset 110B may further include software assets that are not included in the first hardware asset 110A, such as a second OS update OSA2, fourth PS add-in PSA4, fifth PS add-in PSA5, third BR add-in BR3, human resource (HR) management application HR, first HR add-in HRA1, first HR update HRU1, etc.

Figure 5:
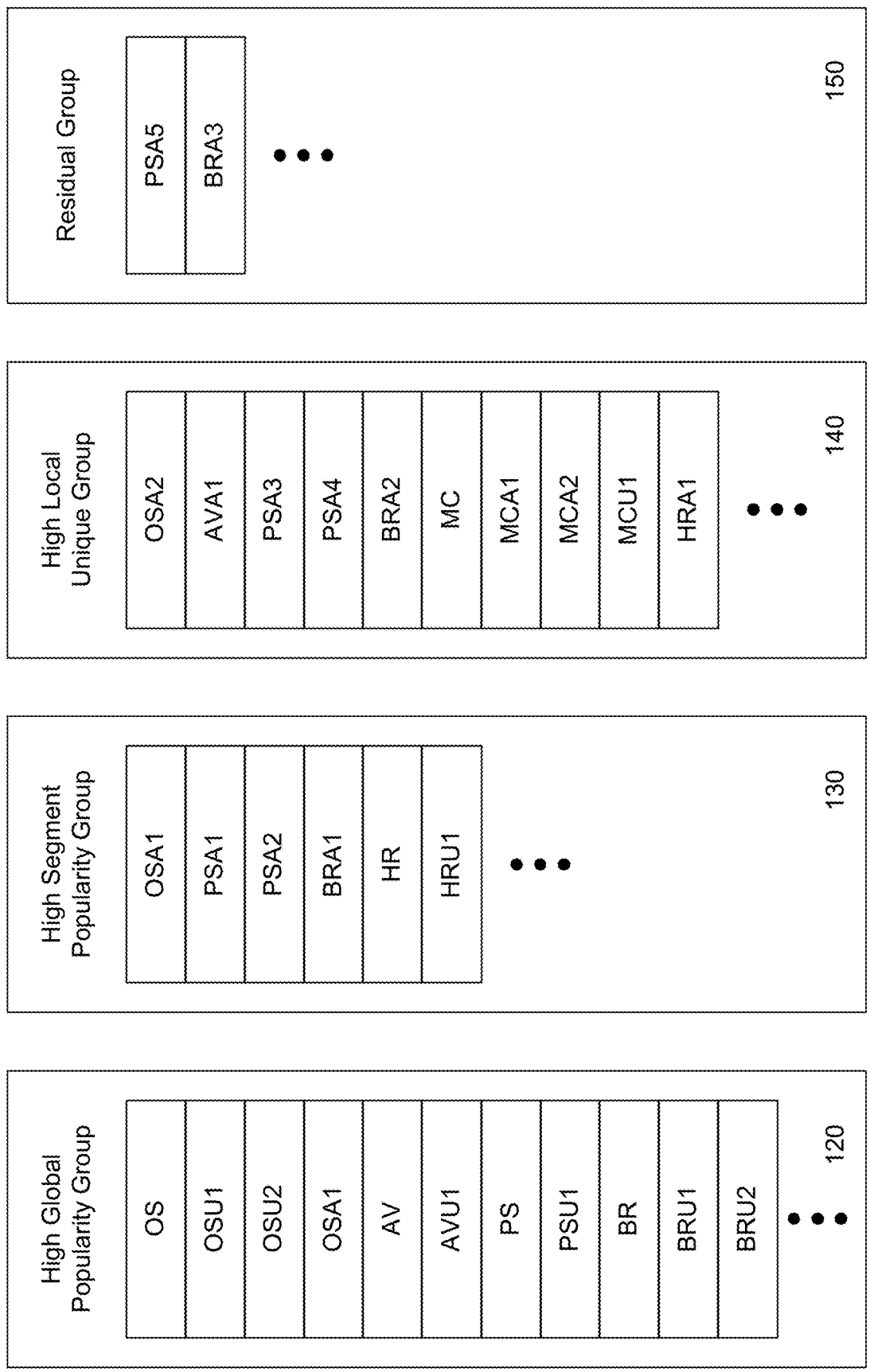
FIG. 5 illustrates an example classification of the software assets of the two different hardware assets.

FIG. 5 illustrates an example classification of the software assets of the first and second hardware assets 110A, 100B. The HGP group 120 may include the operating system OS, first OS update OSU1, second OS update OSU2, first OS add-in OSA1, antivirus application AV, first AV update AVU1, productivity suite PS, first PS update PSU1, web browser BR, first BR update BRU1, second BR update BRU2, etc. The HSP group 130 may include first OS add-in OSA1, first PS add-in PSA1, second PS add-in PSA2, first BR add-in BRA1, HR management application HR, first HR update HRU1, etc. The HLU group 140 may include the second OS add-in OSA2, first AV add-in AVA1, third PS add-in PSA3, forth PS add-in PSA4, mortgage calculation application MC, first MC add-in MCA1, second MC add-in MCA2, first MC update MCU1, first HR add-in HRA1, etc. The residual group 150 may include fifth PS add-in PSA5, third BR add-in BRA3, etc.

Some of the software assets, for example, the second OS add-in OSA2, first HR add-in HRA1 may have low local popularity and usage indexes but may have high local popularity and usage indexes among the hardware assets having a high importance level or ranking. Accordingly, through the classification process, the device 200 may identify not only the software assets having a high popularity at the global or segment levels, but also the locally popular and unique software assets.

Figure 6:
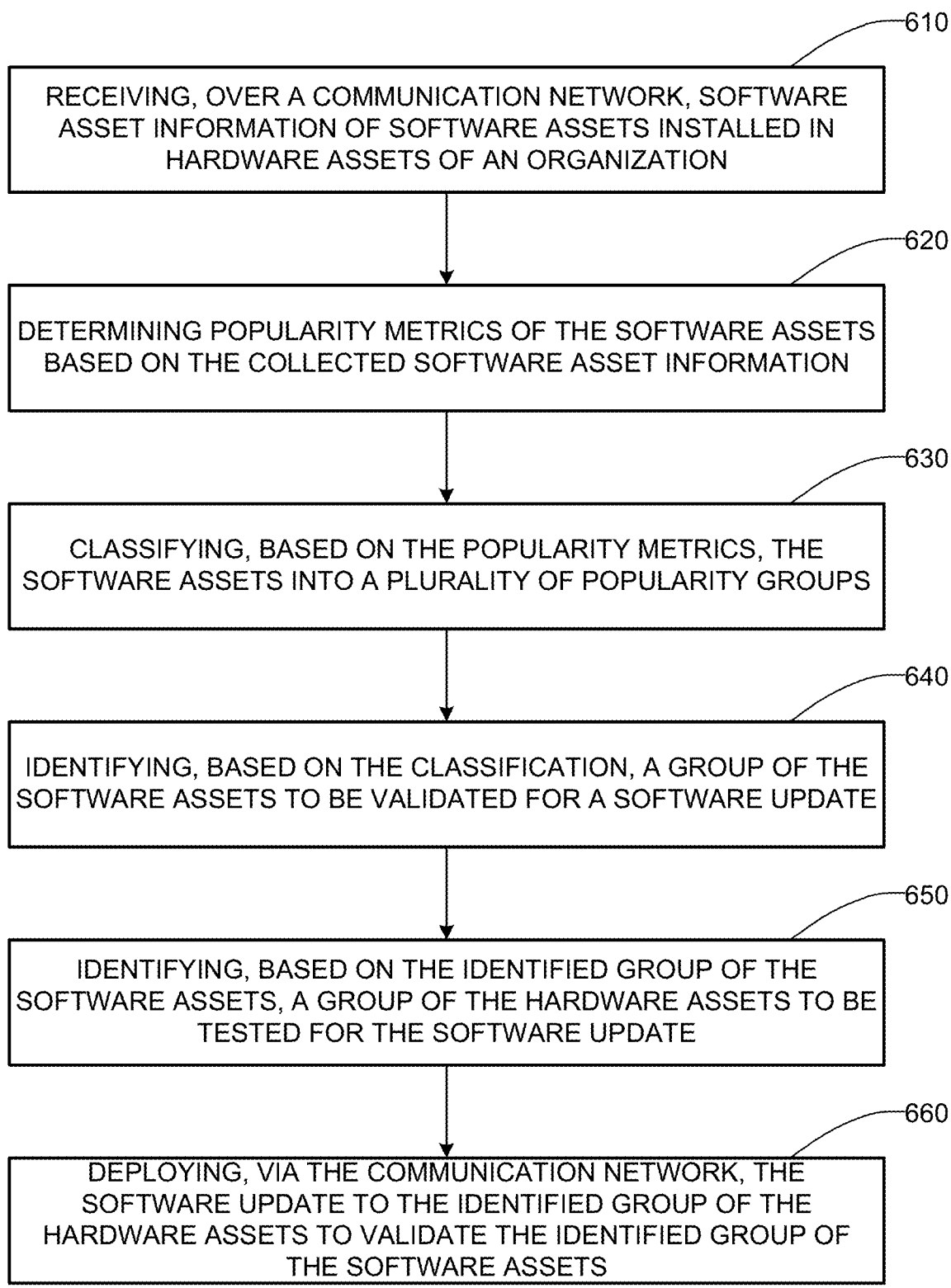
FIG. 6 is a flowchart showing an example process for operating a device to validate software assets prior to a full-scale update rollout.

FIG. 6 is a flowchart showing an example process for operating the device 200 to validate software assets prior to a full-scale update rollout. At step 610, the device 200 may receive software asset information of a plurality of software assets installed in a plurality of hardware assets of an organization. In an implementation, the device 200 may be located within the organization and connected to the hardware assets 100 via one or more communication channels. The device 200 may scan the hardware assets 110 to collect software asset information, such as, installation and usage information of the software assets. Alternatively, the scanning may be carried out by another device to collect the software assets information, which may then be stored in the data storage 210. The device 200 may then retrieve the software asset information from the data storage 210. In another implementation, the device 200 may be located remotely from the organization and connected to the hardware assets 110 via the Internet 220. The device 200 may then remotely scan the hardware assets 110 or remotely access the data storage 210 to retrieve the software asset information.

At step 620, the device 200 may determine popularity metrics of the software assets based on the collected software asset information. The popularity metrics may include a plurality of popularity indexes at various scale levels, such as, the local, segment and global popularity indexes, which may be determined based on the software asset information and global and segment popularity information of the software assets, which may be stored in the data storage 210 or provided from the external sources, such as the external data server 230, via the Internet 220. The popularity metrics may also include the local usage index and hardware asset importance data.

At step 630, the device 200 may classify, based on the popularity metrics, the software assets into a plurality of popularity groups. In an implementation, as shown in FIG. 1, the software assets may be classified into the high global popularity (HGP) group 120, high segment popularity group (HSP) group 130, high local unique (HLU) group 140 and residual group 150. The software assets may be classified in a different manner. For example, importance metrics of the hardware assets may be given a more weight than the popularity metrics such that the software assets that are exclusively used by the executives or management group members may be classified as having a higher priority for validation.

The device 200 may classify a software asset into the HGP group 120 if the global popularity index, local popularity index and local usage index of the software asset are high. The device 200 may classify a software asset into the HSP group 130 if the global popularity index of the software asset is low and the segment popularity index, local popularity index and local usage index of the software asset are high. The device 200 may classify a software asset into the HLU group 140 if the global popularity index and segment popularity index of the software asset are low and the local popularity index and local usage index of the software asset are high. The device 200 may also classify a software asset into the HLU group 140 if the global popularity index, segment popularity index, local popularity index and local usage index of the software asset are low, but the local popularity index and local usage index of the software asset are high among the hardware assets determined to have a high importance.

At step 640, the device 200 may identify, based on the classification, a group of the software assets to be validated for a software update. The group may include the software assets classified to the high global popularity (HGP) group 120, high segment popularity group (HSP) group 130, and high local unique (HLU) group 140. Optionally, the software assets that have been previously validated may be excluded from the validation test, which is described in FIG. 7. The software assets of the residual group 150 may have a very low impact on the hardware assets even if they are not validated. Hence, the software assets of the residual group may be excluded from the validation process.

At step 650, the device 200 may identify, based on the identified group of the software assets, a group of the hardware assets to be tested for the software update. An example of identifying hardware assets for validation is described in U.S. patent application Ser. No. 16/035,634, titled "INTELLIGENT DEVICE SELECTION FOR PILOT TESTING," filed on Jul. 14, 2018, which is incorporated by references in its entirety. Other methods are also contemplated. For example, based on the software asset information, the device 200 may be configured to automatically select a group of hardware assets covering the identified software assets.

At step 660, the device 200 may deploy the software update to the identified group of the hardware assets to validate the identified group of the software assets. For example, the device 200 may send an executable program to the selected hardware assets. Once the program is executed at each selected hardware asset, the program may install an update on the hardware assets and monitor how the hardware and software assets operate. Any abnormalities (e.g., crashes, malfunctions, delays, etc.) of each software asset may be recorded and reported to the device 200. If no abnormalities are reported with respect to a software asset, the device 200 may determine that the software asset is validated for the update.

Accordingly, the above examples provide a technical solution for reliably and accurately identifying the software assets that need to be validated prior to a full-scale software installation or update rollout. The above examples also provide a fail-proof solution for validating the software assets in an organization, which prevents crashes and malfunctions of the hardware and software assets after a full-scale rollout is completed.

Figure 7:
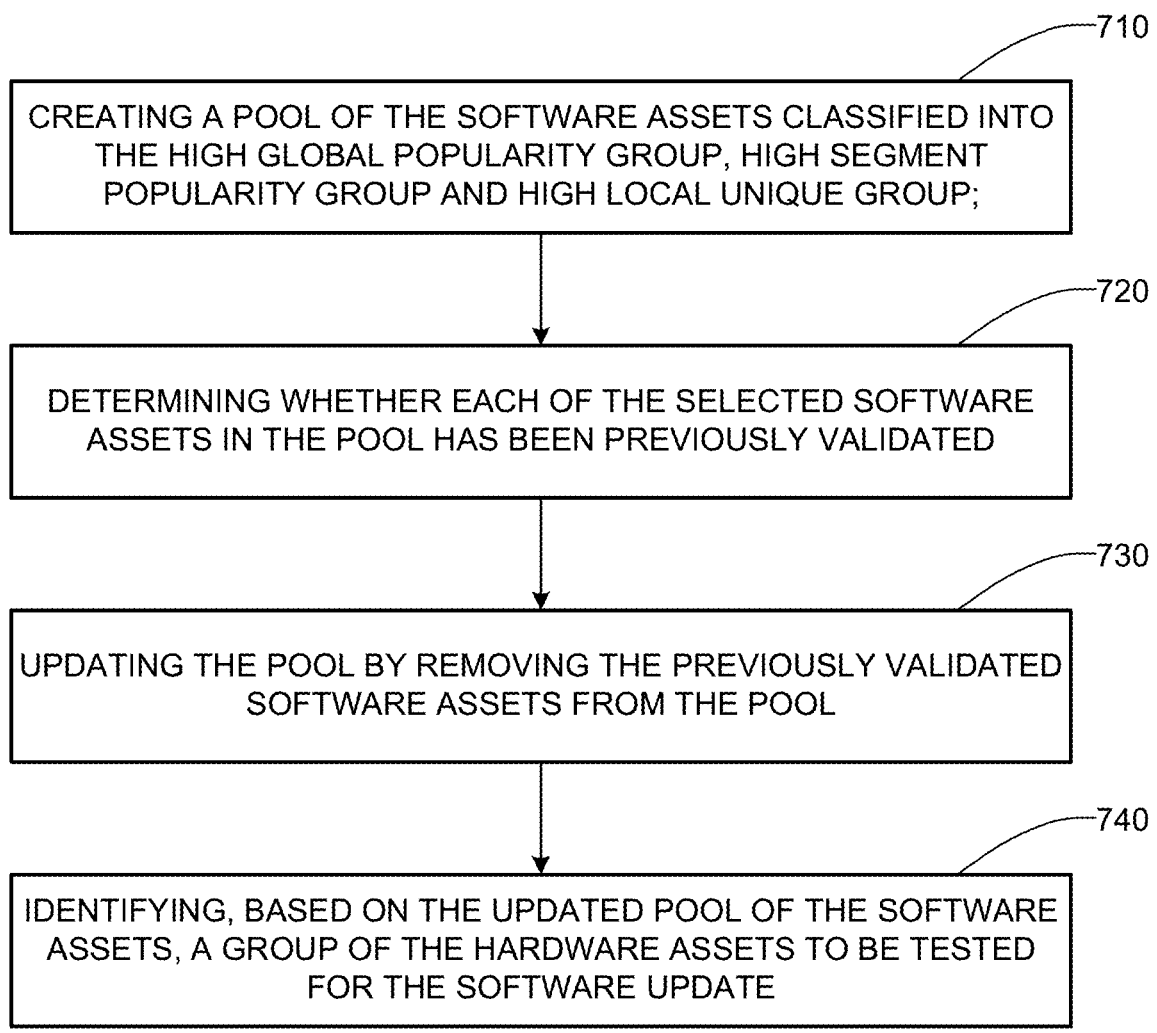
FIG. 7 is a flowchart showing an example process for operating a device to create and update a pool of the software assets for validation.

FIG. 7 is a flowchart showing an example process for operating the device 200 to create and update a pool of the software assets for validation. At step 710, the device 200 may create a pool of the software assets classified into the HGP group 120, HSP group 130 and HLU group 140. At step 720, the device 200 may determine whether each of the selected software assets in the pool has been previously validated. As shown in FIG. 2, the previous validation information may be stored in the data storage 210 or may be published or made available by other organizations. At step 730, the device 200 may update the pool by removing the previously validated software assets from the pool. At step 740, the device 200 may identify, based on the updated pool of the software assets, a group of the hardware assets to be tested for the software update.

Accordingly, by sharing or publishing the previous validation information, organizations may significantly reduce a number of the software assets that need to be validated. This may also allow the organizations to share the burden of validating a large number of software assets. Furthermore, when a software asset fails to pass a pilot test and cannot be validated, the developer may be notified with the details of the validation failure. The developer may then be able to fix and test the software asset and provide a validated software asset. Accordingly, the above examples may reduce a lot of effort and time to validate numerous software assets by sharing the validation results among numerous organizations in various industry or business segments.

Figure 8:
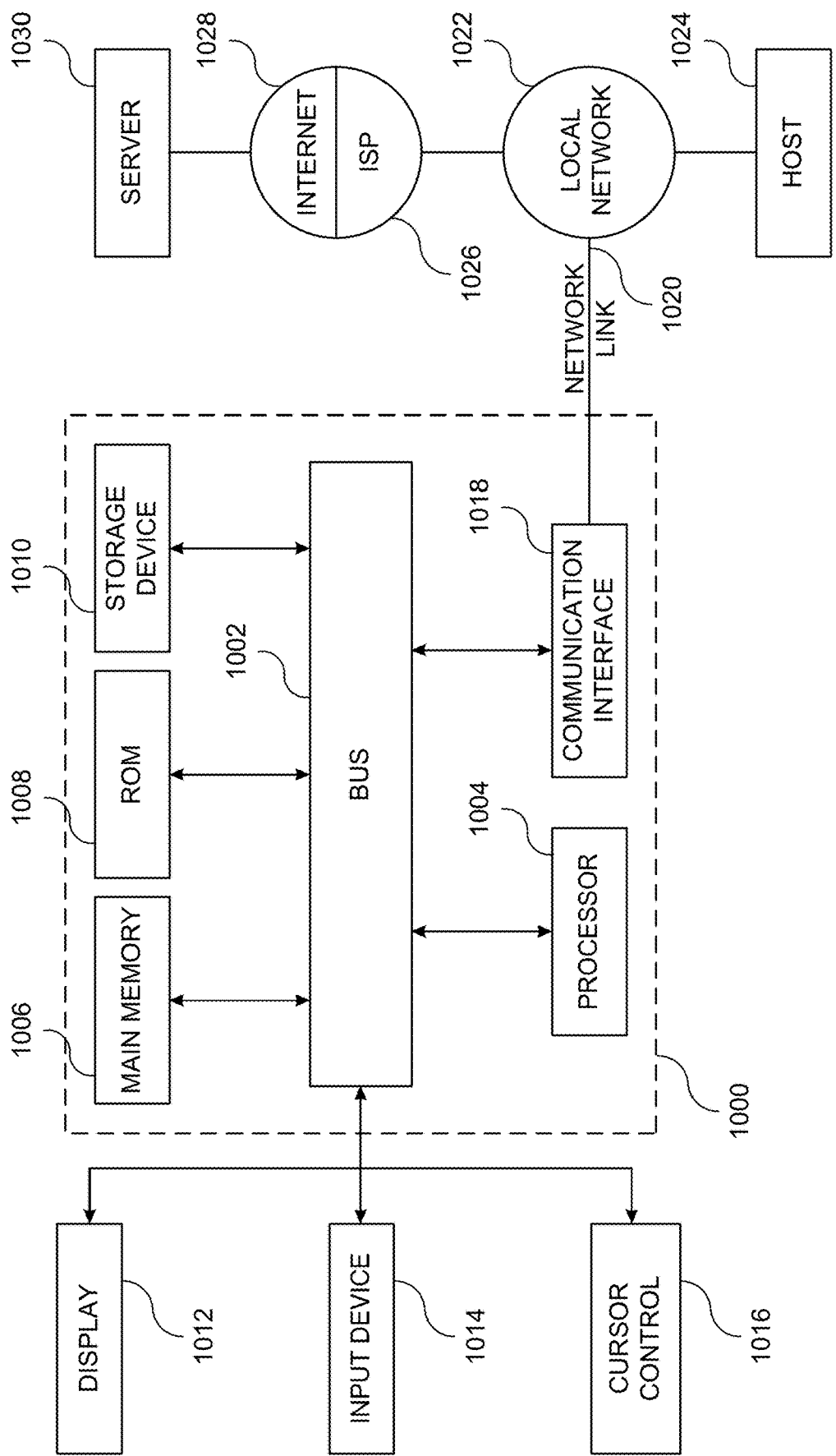
FIG. 8 is a block diagram showing an example computer system upon which aspects of this disclosure may be implemented.

FIG. 8 is a block diagram showing an example a computer system 1000 upon which aspects of this disclosure may be implemented. The computer system 1000 may include a bus 1002 or other communication mechanism for communicating information, and a processor 1004 coupled with the bus 1002 for processing information. The computer system 1000 may also include a main memory 1006, such as a random-access memory (RAM) or other dynamic storage device, coupled to the bus 1002 for storing information and instructions to be executed by the processor 1004. The main memory 1006 may also be used for storing temporary variables or other intermediate information during execution of instructions to be executed by the processor 1004. The computer system 1000 may implement, for example, the device 200 shown in FIG. 2.

The computer system 1000 may further include a read only memory (ROM) 1008 or other static storage device coupled to the bus 1002 for storing static information and instructions for the processor 1004. A storage device 1010, such as a flash or other non-volatile memory may be coupled to the bus 1002 for storing information and instructions.

The computer system 1000 may be coupled via the bus 1002 to a display 1012, such as a liquid crystal display (LCD), for displaying information. One or more user input devices, such as the example user input device 1014 may be coupled to the bus 1002, and may be configured for receiving various user inputs, such as user command selections and communicating these to the processor 1004, or to the main memory 1006. The user input device 1014 may include physical structure, or virtual implementation, or both, providing user input modes or options, for controlling, for example, a cursor, visible to a user through display 1012 or through other techniques, and such modes or operations may include, for example virtual mouse, trackball, or cursor direction keys.

The computer system 1000 may include respective resources of the processor 1004 executing, in an overlapping or interleaved manner, respective program instructions. Instructions may be read into the main memory 1006 from another machine-readable medium, such as the storage device 1010. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 1010. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 1000 may also include a communication interface 1018 coupled to the bus 1002, for two-way data communication coupling to a network link 1020 connected to a local network 1022. The network link 1020 may provide data communication through one or more networks to other data devices. For example, the network link 1020 may provide a connection through the local network 1022 to a host computer 1024 or to data equipment operated by an Internet Service Provider (ISP) 1026 to access through the Internet 1028 a server 1030, for example, to obtain code for an application program.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for identifying sample hardware assets for a pilot test of a software asset, comprising:
   a processor; and
   a memory in communication with the processor, the memory comprising executable instructions that, when executed by the processor, cause the processor to control the system to perform functions of:
   collecting software asset information of a plurality of software assets installed in a plurality of hardware assets of a target organization, the software asset information including installation or usage information of each individual software asset at a plurality of scale levels comprising:
      an organization level encompassing the target organization;
      an industry segment level encompassing an industry segment comprising a plurality of organizations, including the target organization, which are of a same or similar industry type; and
      a global level encompassing a plurality of industry segments including the industry segment of the target organization;
   determining, based on the collected software asset information, popularity metrics of the software assets, the popularity metric of each software asset being indicative of degrees of the installations or usage of each software asset at the plurality of scale levels;

classifying, based on the popularity metrics, the software assets into a plurality of popularity groups, the software assets of a different popularity group having a different range of the popularity metrics;

identifying, based on the classification of the software assets, a pilot test software asset sample group comprising software assets to be validated via a pilot test of a new software asset;

identifying, based on the identified pilot test software asset sample group of the software assets, a pilot test hardware asset sample group comprising hardware assets covering the software assets of the pilot test software asset sample group; and deploying, to the hardware assets of the identified pilot test hardware asset sample group, the new software asset, the hardware assets of the identified pilot test hardware asset sample group executing the pilot test of the new software asset.

2. The system of claim 1, wherein, for collecting the software asset information, the instructions, when executed by the processor, further cause the processor to control the system to perform a function of scanning the plurality of hardware assets to identify an installation or usage status of each software asset within each hardware asset.

3. The system of claim 1, wherein the software asset information further includes at least one of:
a global popularity of each individual software asset at the global level;
an industry segment popularity of each individual software asset at the industry segment level; and
an importance of each individual hardware asset at the organization level.

4. The system of claim 1, wherein the popularity metrics of the software assets comprise:
a global popularity index of each software asset determined based on the installation or usage information of the software assets at the global level;
an industry segment popularity index of each software asset determined based on the installation or usage information of the software assets at the industry segment level;
a local popularity index of each software asset determined based on the installation or usage information of the software assets at the organization level; and
a local usage index of each software asset determined based on the installation or usage information of the software assets at the organization level.

5. The system of claim 4, wherein the plurality of popularity groups includes:
a high global popularity group comprising one or more software assets selected based on the global popularity index;
a high industry segment popularity group comprising one or more software assets selected based on the industry segment popularity index; and
a high local unique group comprising one or more software assets selected based on the local usage index.

6. The system of claim 5, wherein, for classifying the software assets into a plurality of popularity groups, the instructions, when executed by the processor, further cause the processor to control the system to perform functions of:
determining whether each software asset is classified into the high global popularity group based on the global popularity index, local popularity index and local usage index of the software asset;
determining whether each software asset is classified into the high industry segment popularity group based on the global popularity index, industry segment popularity index, local popularity index and local usage index of the software asset; and
determining whether software asset is classified into the high local unique group based on the global popularity index, industry segment popularity index, the local popularity index and local usage index of the software asset.

7. The system of claim 6, wherein, for classifying the software assets into the plurality of popularity groups, the instructions, when executed by the processor, further cause the processor to control the system to perform a further function of determining whether each individual software asset is classified into the high local unique group based on the global popularity index, industry segment popularity index, local popularity index and local usage index of the software asset.

8. The system of claim 5, wherein, for identifying the pilot test software asset sample group, the instructions, further cause the processor to control the system to perform functions of:
creating a pool of the software assets classified into the high global popularity group, high industry segment popularity group and high local unique group;
determining whether each software asset in the pool has been previously validated via a previous pilot test of the new software asset; and
updating the pool by removing the previously validated software assets from the pool,
wherein the pilot test hardware asset sample group is identified based on the software assets of the updated pool.

9. A method of operating a device system for identifying sample hardware assets for a pilot test of a software asset, comprising:
collecting software asset information of a plurality of software assets installed in a plurality of hardware assets of a target organization, the software asset information including installation or usage information of each individual software asset at a plurality of scale levels comprising:
an organization level encompassing the target organization;
an industry segment level encompassing an industry segment comprising a plurality of organizations, including the target organization, which are of a same or similar industry type; and
a global level encompassing a plurality of industry segments including the industry segment of the target organization;
determining, based on the collected software asset information, popularity metrics of the software assets, the popularity metric of each software asset being indicative of a degree of the installations or usage of each software asset at the plurality of scale levels;
classifying, based on the popularity metrics, the software assets into a plurality of popularity groups, the software assets of a different popularity group having a different range of the popularity metrics;
identifying, based on the classification of the software assets, a pilot test software asset sample group comprising software assets to be validated via a pilot test of a new software asset;

identifying, based on the identified pilot test software asset sample group of the software assets, a pilot test hardware asset sample group comprising hardware assets covering the software assets of the pilot test software asset sample group; and deploying, to the hardware assets of the identified pilot test hardware asset sample group, the new software asset, the hardware assets of the identified pilot test hardware asset sample group executing the pilot test of the new software asset.

10. The method of claim 9, wherein collecting the software asset information comprises scanning the plurality of hardware assets to identify an installation or usage status of each software asset within each hardware asset.

11. The method of claim 9, wherein the software asset information further includes at least one of:
a global popularity of each individual software asset at the global level;
an industry segment popularity of each individual software asset at the industry segment level; and
an importance of each individual hardware asset at the organization level.

12. The method of claim 9, wherein the popularity metrics of the software assets comprise:
a global popularity index of each software asset determined based on the installation or usage information of the software assets at the global level;
an industry segment popularity index of each software asset determined based on the installation or usage information of the software assets at the industry segment level;
a local popularity index of each software asset determined based on the installation or usage information of the software assets at the organization level; and
a local usage index of each software asset determined based on the installation or usage information of the software assets at the organization level.

13. The method of claim 12, wherein the plurality of popularity groups includes:
a high global popularity group comprising one or more software assets selected based on the global popularity index;
a high industry segment popularity group comprising one or more software assets selected based on the industry segment popularity index; and
a high local unique group comprising one or more software assets selected based on the local usage index.

14. The method of claim 13, wherein the classifying the software assets into a plurality of popularity groups comprises:
determining whether each software asset is classified into the high global popularity group based on the global popularity index, local popularity index and local usage index of the software asset;
determining whether each software asset is classified into the high industry segment popularity group based on the global popularity index, industry segment popularity index, local popularity index and local usage index of the software asset; and
determining whether software asset is classified into the high local unique group based on the global popularity index, industry segment popularity index and the local popularity index and local usage index of the software asset.

15. The method of claim 14, further comprising determining whether each individual software asset is classified into the high local unique group based on the global popularity index, industry segment popularity index, local popularity index and local usage index of the software asset.

16. The method of claim 13, wherein the identifying the pilot test software asset sample group comprises:
creating a pool of the software assets classified into the high global popularity group, high industry segment popularity group and high local unique group;
determining whether each software asset in the pool has been previously validated via a previous pilot test of the new software asset; and
updating the pool by removing the previously validated software assets from the pool,
wherein the pilot test hardware asset sample group is identified based on the software assets of the updated pool.

17. A non-transitory computer readable medium containing instructions which, when executed by a processor, cause a system to perform functions of:
collecting software asset information of a plurality of software assets installed in a plurality of hardware assets of a target organization, the software asset information including installation or usage information of each individual software asset at a plurality of scale levels comprising:
an organization level encompassing the target organization;
an industry segment level encompassing an industry segment comprising a plurality of organizations, including the target organization, which are of a same or similar industry type; and
a global level encompassing a plurality of industry segments including the industry segment of the target organization;
determining, based on the collected software asset information, popularity metrics of the software assets, the popularity metric of each software asset being indicative of a degree of the installations or usage of each software asset at the plurality of scale levels;
classifying, based on the popularity metrics, the software assets into a plurality of popularity groups, the software assets of a different popularity group having a different range of the popularity metrics;
identifying, based on the classification of the software assets, a pilot test software asset sample group comprising software assets to be validated via a pilot test of a new software asset;
identifying, based on the identified pilot test software asset sample group of the software assets, a pilot test hardware asset sample group comprising hardware assets covering the software assets of the pilot test software asset sample group; and
deploying, to the hardware assets of the identified pilot test hardware asset sample group, the new software asset, the hardware assets of the identified pilot test hardware asset sample group executing the pilot test of the new software asset.

18. The non-transitory computer readable medium of claim 17, wherein, for collecting the software asset information, the instructions, when executed by the processor, further cause the processor to control the system to perform a function of scanning the plurality of hardware assets to identify an installation or usage status of each software asset within each hardware asset.

19. The non-transitory computer readable medium of claim 17, wherein the software asset information further includes at least one of:

a global popularity of each individual software asset at the global level;

an industry segment popularity of each individual software asset at the industry segment level; and an importance of each individual hardware asset at the organization level.

20. The non-transitory computer readable medium of claim 17, wherein the popularity metrics of the software assets comprise:

a global popularity index of each software asset determined based on the installation or usage information of the software assets at the global level;

an industry segment popularity index of each software asset determined based on the installation or usage information of the software assets at the industry segment level;

a local popularity index of each software asset determined based on the installation or usage information of the software assets at the organization level; and a local usage index of each software asset determined based on the installation or usage information of the software assets at the organization level.

* * * * *